United States Patent

Furukawa

[11] Patent Number: 5,887,268
[45] Date of Patent: Mar. 23, 1999

[54] AUTOMATICALLY DRIVEN MOTOR VEHICLE

[75] Inventor: Yoshimi Furukawa, Wako, Japan

[73] Assignee: Honda Giken Kogyo Kabushiki Kaisha, Tokyo, Japan

[21] Appl. No.: 739,524

[22] Filed: Oct. 29, 1996

[30] Foreign Application Priority Data

Oct. 31, 1995 [JP] Japan .................................. 7-283973

[51] Int. Cl.⁶ .................................................. G06F 7/70
[52] U.S. Cl. ................................ 701/23; 701/25; 318/687
[58] Field of Search .............................. 701/1, 2, 19, 20,
701/23, 26, 30, 70, 74; 318/572, 573, 603,
615, 616, 561, 687; 340/901, 903, 435;
348/42, 116, 118, 135, 148; 180/167, 168,
169

[56] References Cited

U.S. PATENT DOCUMENTS

| | | | |
|---|---|---|---|
| 4,562,543 | 12/1985 | Zuber et al. ................................. | 701/20 |
| 4,617,627 | 10/1986 | Yasunobu et al. ......................... | 701/20 |
| 4,620,280 | 10/1986 | Conklin ...................................... | 701/20 |
| 4,700,302 | 10/1987 | Arakawa et al. .......................... | 701/25 |
| 4,808,901 | 2/1989 | Sakamoto .................................. | 318/687 |
| 4,817,000 | 3/1989 | Eberhardt ................................... | 701/200 |
| 5,142,207 | 8/1992 | Song ........................................... | 318/615 |
| 5,222,024 | 6/1993 | Orita et al. .................................. | 701/93 |
| 5,307,419 | 4/1994 | Tsujino et al. ............................. | 701/28 |
| 5,367,457 | 11/1994 | Ishida ......................................... | 701/28 |
| 5,530,420 | 6/1996 | Tsuchiya et al. .......................... | 701/28 |

Primary Examiner—Jacques H. Louis-Jacques
Attorney, Agent, or Firm—Lyon & Lyon LLP

[57] ABSTRACT

An automatically driven motor vehicle automatically runs on a running path having path markers while detecting the path markers with a marker sensor. A present position of the motor vehicle on the running path is recognized, and a speed plan which governs a position and a speed of the motor vehicle on the running path is generated. A planned position to be reached by the motor vehicle after a predetermined time and a planned speed of the motor vehicle at the planned position are determined from the present position of the motor vehicle based on the speed plan. A predicted position to be reached by the motor vehicle after the predetermined time and a predicted speed of the motor vehicle at the planned position are determined from the present position, speed, and acceleration of the motor vehicle. A distance deviation between the predicted position and the predicted position and a speed deviation between the planned speed and the predicted speed are determined. Acceleration/deceleration correcting data for the motor vehicle are determined based on the distance deviation and the speed deviation. Acceleration/deceleration of the motor vehicle are controlled based on the acceleration/deceleration correcting data.

10 Claims, 3 Drawing Sheets

AUTOMATICALLY DRIVEN MOTOR VEHICLE

BACKGROUND OF THE INVENTION

1. Field of the Invention

The present invention relates to an automatically driven motor vehicle, and more particularly to an automatically driven motor vehicle capable of automatically running within a lane on a road based on positional information obtained from the road.

2. Description of the Prior Art

Research efforts are being made to develop a technology for automatically driving motor vehicles such as automobiles on roads while detecting obstacles with a radar, a CCD camera, or their combination to recognize front obstacles and road conditions. However, there has not been available any technology, to be incorporated into automatically driven motor vehicles, for appropriately recognizing front obstacles and road conditions on any roads.

Automatic vehicle travel control under given conditions has already been practiced in limited applications such as automatic transport carriage control in factories, for example. Such an automatic transport carriage is controlled to travel at a low speed along a predetermined path based on the detection of magnetic markers that are arranged at given intervals along the path.

However, it is difficult to control the automatic transport carriage to run accurately on the predetermined path, and the actual position where the automatic transport carriage runs tends to be displaced in error from the predetermined path while the automatic transport carriage is running.

It has been customary to control the automatic transport carriage to run along the predetermined path by detecting a displacement error between the present position of the automatic transport carriage and the predetermined path and eliminating the displacement error under feedback control.

The conventional automatic transport carriage control process has been unstable because of hunting in eliminating displacement errors particularly when the automatic transport carriage runs at high speeds. It has been difficult to run the automatic transport carriage on general roads while controlling its speed.

SUMMARY OF THE INVENTION

It is therefore an object of the present invention to provide an automatically driven motor vehicle which is capable of automatically running stably on a road under certain conditions, e.g., a motor highway with arrays of magnetic information sources or markers installed on running paths in respective lanes.

Another object of the present invention is to provide an automatically driven motor vehicle which is capable of smoothly controlling the speed of travel thereof.

To achieve the above objects, there is provided in accordance with the present invention an automatically driven motor vehicle for automatically running on a running path having path markers while detecting the path markers with a marker sensor, comprising position recognizing means for recognizing a present position of the motor vehicle on the running path, speed plan generating means for generating a speed plan which governs a position and a speed of the motor vehicle on the running path, planned value determining means for determining a planned position to be reached by the motor vehicle after a predetermined time and a planned speed of the motor vehicle at the planned position, from the present position of the motor vehicle based on the speed plan, predicted value calculating means for determining a predicted position to be reached by the motor vehicle after the predetermined time and a predicted speed of the motor vehicle at the predicted position, from the present position, speed, and acceleration of the motor vehicle, deviation calculating means for determining a distance deviation between the planned position and the predicted position and a speed deviation between the planned speed and the predicted speed, acceleration/deceleration data calculating means for generating acceleration/deceleration correcting data for the motor vehicle based on the distance deviation and the speed deviation, and acceleration/deceleration control means for controlling acceleration/deceleration of the motor vehicle based on the acceleration/deceleration correcting data.

The speed plan generating means generates a speed plan which governs a position and a speed of the motor vehicle on the running path, and the planned value determining means determines a planned position to be-reached by the motor vehicle after a predetermined time (a position on the running path which should be reached by the motor vehicle after the predetermined time) and a planned speed of the motor vehicle at the planned position (a speed which should be reached by the motor vehicle after the predetermined time), from the present position of the motor vehicle based on the speed plan and on the position recognized by the position recognizing means. The predicted value calculating means determines a predicted position to be reached by the motor vehicle after the predetermined time and a predicted speed of the motor vehicle at the predicted position, from the present position, speed, and acceleration of the motor vehicle. The deviation calculating means determines a distance deviation between the planned position and the predicted position and a speed deviation between the planned speed and the predicted speed. The acceleration/deceleration data calculating means generates acceleration/deceleration correcting data for the motor vehicle based on the distance deviation and the speed deviation. The acceleration/deceleration control means controls acceleration/deceleration of the motor vehicle based on the acceleration/deceleration correcting data.

Therefore, the acceleration/deceleration of the motor vehicle is controlled based on the distance deviation between the future position which should be reached by the motor vehicle (planned position) after the predetermined time and the position predicted of the motor vehicle (predicted position) after the predetermined time, and the speed deviation between the speed which should be reached by the motor vehicle (planned speed) after the predetermined time and the speed predicted of the motor vehicle (predicted speed) after the predetermined time. That is, the acceleration/deceleration of the motor vehicle is controlled according to the future position and speed of the motor vehicle after the predetermined time.

According to the present invention, therefore, the speed of the motor vehicle can be controlled highly stably to run stably on the running path.

The path markers comprise an array of magnetic information sources arranged at a predetermined interval. Since the path markers comprise magnetic information sources, they can be detected by magnetic sensors (marker sensors) independently of weather conditions or the like, allowing the position of the motor vehicle to be recognized reliably.

The position recognizing means comprises means for detecting a distance traversed by the motor vehicle along the running path, and means for recognizing the present position of the motor vehicle based on the detected distance.

If the path markers comprise an array of magnetic information sources arranged at a predetermined interval, then the position recognizing means comprises means for detecting the distance based on the number of times that the magnetic information sources are detected by the marker sensor.

Inasmuch as the magnetic information sources are arranged at a predetermined interval, the product of the number of times that the magnetic information sources are detected and the interval between the magnetic information sources represents the distance traveled by the motor vehicle along the running path. Consequently, the distance traveled by the motor vehicle along the running path can be determined based on the number of times that the magnetic information sources are detected. By thus detecting the distance traveled by the motor vehicle, the position of the motor vehicle on the running path can easily be recognized.

The automatically driven motor vehicle further comprises communication means for transmitting travel information to and receiving travel information from a travel information providing facility installed outside of the motor vehicle, and the speed plan generating means comprises means for generating the speed plan based on speed command information supplied from the travel information providing facility through the communication means to the speed plan generating means.

Because speed command information for the motor vehicle depending on road conditions, e.g., a traffic jam condition, a road curvature, etc. can be given from the travel information providing facility, the speed plan can be generated according to the road conditions based on the speed command information.

The travel information providing facility comprises, for example, a leakage coaxial cable installed along the running path.

The predicted value calculating means comprises means for calculating the predicted position from the position recognized by the position recognizing means, a speed of the motor vehicle expressed by a first-order differential of the position, and an acceleration of the motor vehicle expressed by a second-order differential of the position, and for calculating the predicted speed from the speed of the motor vehicle expressed by the first-order differential of the position and the acceleration of the motor vehicle expressed by the second-order differential of the position.

The predicted position, i.e., the position predicted of the motor vehicle after the predetermined time, is calculated from the position recognized by the position recognizing means, a speed of the motor vehicle expressed by a first-order differential of the position, and an acceleration of the motor vehicle expressed by a second-order differential of the position. The predicted speed is calculated from the speed of the motor vehicle expressed by the first-order differential of the position and the acceleration of the motor vehicle expressed by the second-order differential of the position. Accordingly, the predicted position and speed can easily be determined.

The automatically driven motor vehicle further comprises a speed sensor for detecting a speed of the motor vehicle and an acceleration sensor for detecting an acceleration of the motor vehicle, and the predicted value calculating means comprises means for calculating the predicted position from the position recognized by the position recognizing means, a speed of motor vehicle detected by the speed sensor, and an acceleration of the motor vehicle detected by the acceleration sensor, and calculates the predicted speed from the speed of the motor vehicle detected by the speed sensor, and an acceleration of the motor vehicle detected by the acceleration sensor.

The automatically driven motor vehicle further comprises intervehicular communication means for transmitting and receiving information indicative of positions of front and following motor vehicles at least between the front and following motor vehicles.

The automatically driven motor vehicle further comprises front motor vehicle predicted value calculating means for determining a predicted position to be reached by the front motor vehicle after the predetermined time and a predicted speed of the front motor vehicle at the predicted position, from the information received through the intervehicular communication means, predicted intervehicular distance calculating means for determining an intervehicular distance between the front and following motor vehicles after the predetermined time, from the predicted position to be reached by the front motor vehicle and the predicted position determined by the predicted value calculating means, and intervehicular speed difference calculating means for determining an intervehicular speed difference between the front and following motor vehicles after the predetermined time, from the predicted speed to be reached by the front motor vehicle and the predicted speed determined by the predicted value calculating means.

The automatically driven motor vehicle further comprises second acceleration/deceleration data calculating means for generating acceleration/deceleration correcting data for the motor vehicle based on the intervehicular distance and the intervehicular speed difference, the acceleration/deceleration control means comprising means for alternatively selecting the acceleration/deceleration correcting data generated by the acceleration/deceleration data calculating means and the acceleration/deceleration correcting data generated by the second acceleration/deceleration data calculating means to control the acceleration/deceleration of the motor vehicle.

The front motor vehicle predicted value calculating means determines a predicted position to be reached by the front motor vehicle after the predetermined time and a predicted speed of the front motor vehicle at the predicted position, from a present position of the front motor vehicle which is received through the intervehicular communication means. The predicted intervehicular distance calculating means and the intervehicular speed difference calculating means determine an intervehicular distance and an intervehicular speed difference, respectively, between the front and following motor vehicles after the predetermined time, from the predicted position and speed to be reached by the front motor vehicle and the predicted position and speed to be reached by the motor vehicle of its own as determined by the predicted value calculating means. Based on the intervehicular distance and the intervehicular speed difference, the second acceleration/deceleration data calculating means generates acceleration/deceleration correcting data for the motor vehicle. The acceleration/deceleration control means comprising means for alternatively selecting the acceleration/deceleration correcting data thus generated and the acceleration/deceleration correcting data generated depending on the distance deviation and the speed deviation from the speed plan, thereby to control the acceleration/deceleration of the motor vehicle.

Consequently, the speed of the motor vehicle can be controlled in view of not only the speed plan on the running path, but also the intervehicular distance and the intervehicular speed difference in the future after the predetermined time.

The acceleration/deceleration control means comprises means for selecting one of the acceleration/deceleration correcting data generated by the acceleration/deceleration data calculating means and the acceleration/deceleration correcting data generated by the second acceleration/deceleration data calculating means, one of which reduces forward acceleration of the motor vehicle.

In this manner, it is possible to carry out the optimum control of the acceleration/deceleration of the motor vehicle according to the speed plan on the running path or the acceleration/deceleration of the motor vehicle in view of the intervehicular distance and the intervehicular speed difference with respect to the front motor vehicle.

The predicted value calculating means comprises means for calculating the predicted position from a position of the front motor vehicle obtained through the intervehicular communication means, a speed of the front motor vehicle expressed by a first-order differential of the position, and an acceleration of the front motor vehicle expressed by a second-order differential of the position, and calculating the predicted speed of the front motor vehicle from the speed of the front motor vehicle expressed by the first-order differential of the position and the acceleration of the front motor vehicle expressed by the second-order differential of the position.

If the information transmitted and received through the intervehicular communication means includes a speed and an acceleration of the motor vehicle, then the front motor vehicle predicted value calculating means comprises means for calculating the predicted position of the front motor vehicle from the position, speed, and acceleration of the front motor vehicle which are obtained through the intervehicular communication means, and calculating the predicted speed of the front motor vehicle from the speed and acceleration of the front motor vehicle which are obtained through the intervehicular communication means.

According to the present invention, there is also provided an automatically driven motor vehicle for automatically running on a running path having path markers while detecting the path markers with a marker sensor, comprising position recognizing means for recognizing a present position of the motor vehicle on the running path, intervehicular communication means for transmitting and receiving information relative to positions of front and following motor vehicles at least between the front and following motor vehicles, own motor vehicle predicted value calculating means for determining a predicted position to be reached by its own motor vehicle after a predetermined time and a predicted speed to be reached by its own motor vehicle at the predicted position, based on the present position, speed, and acceleration of its own motor vehicle, front motor vehicle predicted value calculating means for determining a predicted position to be reached by the front motor vehicle after the predetermined time and a predicted speed to be reached by the front motor vehicle at the predicted position, from the information received from the front motor vehicle through the intervehicular communication means, predicted intervehicular distance calculating means for determining an intervehicular distance between the front and its own motor vehicles after the predetermined time, from the predicted position to be reached by the front motor vehicle and the predicted position to be reached by its own motor vehicle, intervehicular speed difference calculating means for determining an intervehicular speed difference between the front and its own motor vehicles after the predetermined time, from the predicted speed to be reached by the front motor vehicle and the predicted speed to be reached by its own motor vehicle, acceleration/deceleration data calculating means for generating acceleration/deceleration correcting data for the motor vehicle based on the intervehicular distance and the intervehicular speed difference, and acceleration/deceleration control means for controlling acceleration/deceleration of its own motor vehicle based on the acceleration/deceleration correcting data.

Since the acceleration/deceleration of its own motor vehicle is controlled based on the intervehicular distance and the intervehicular speed difference between its own motor vehicle and the front motor vehicle, the motor vehicle can be automatically driven to travel along the running path while keeping an appropriate distance between itself and the front motor vehicle.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 2:
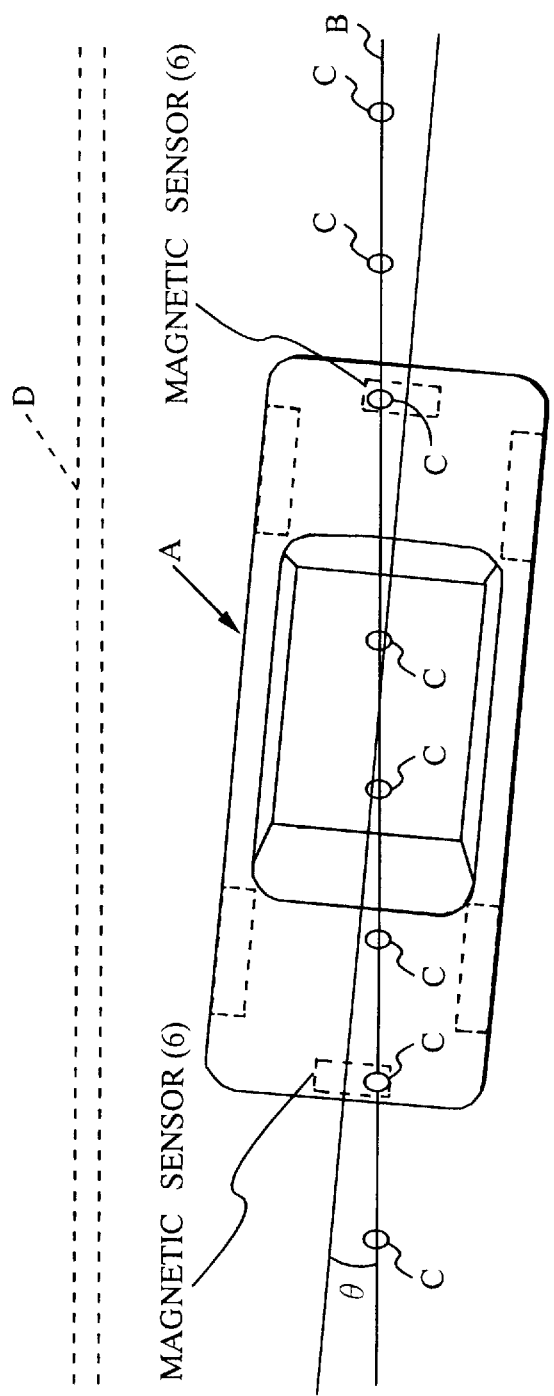
FIG. 2 is a schematic view illustrative of the manner in which each of the automatically driven motor vehicles shown in FIG. 1 magnetically senses magnetic information sources.

As shown in FIG. 2, an automatically driven motor vehicle A according to the present invention automatically runs along a running path B at the center of an automatic running road while detecting magnetic information sources (magnetic nails or markers) C which are embedded in the road at given intervals of 1 m, for example. If there is another motor vehicle (not shown in FIG. 2) running forward of the motor vehicle A, then the motor vehicle A keeps a given intervehicular distance between itself and the front motor vehicle while running behind the front motor vehicle. An LCX (leakage coaxial) cable D is installed on and along the road for transmitting information to and receiving information from the motor vehicle A. Furthermore, information representing running conditions of front and following motor vehicles is also transmitted between these front and following motor vehicles.

Figure 1:
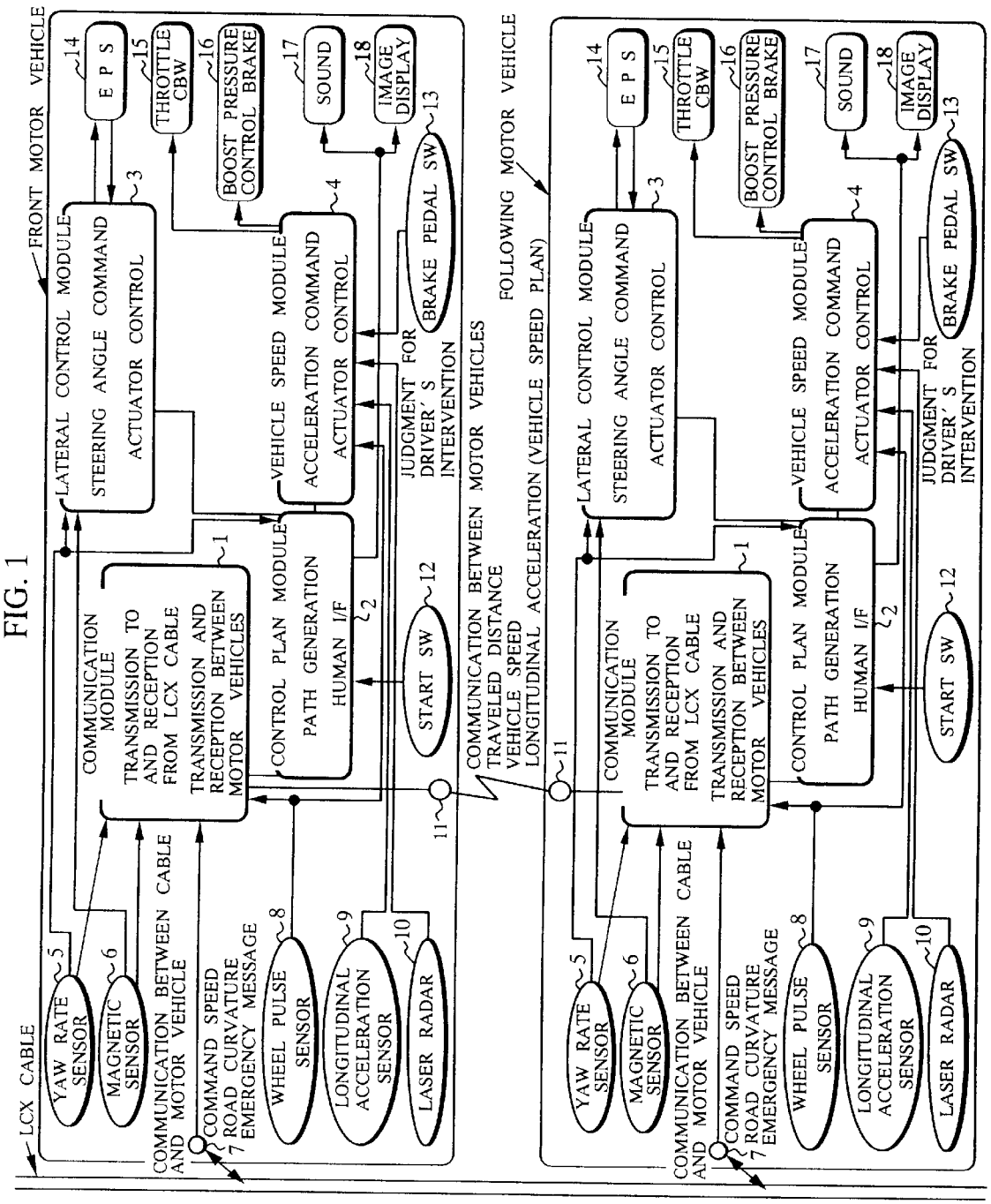
FIG. 1 is a block diagram of a system of controlling an automatically driven motor vehicle according to the present invention.

A system of controlling an automatically driven motor vehicle to follow another automatically driven motor vehicle according to the present invention is shown in FIG. 1.

FIG. 1 shows two automatically driven motor vehicles, one running forward of the other along a predetermined path. Since these two automatically driven motor vehicles are identical to each other, only one of them will be described below in detail.

As shown in FIG. 1, the motor vehicle has a communication signal processor 1, a control plan processor 2, a lateral (steering) vehicle controller 3, and a vehicle speed controller 4. Each of these processors and controllers comprises a module having a central processing unit (CPU). The motor vehicle also has a yaw rate sensor 5 for detecting an angular velocity of the motor vehicle in a lateral or steering direction thereof, two magnetic sensors 6 for detecting the magnetic information sources C, a wheel pulse sensor 8 for outputting a pulse each time the wheels of the motor vehicle make one revolution, i.e., per distance traversed by the motor vehicle when the wheels make one revolution, a longitudinal acceleration sensor 9 for detecting an acceleration of the motor vehicle in a longitudinal direction of the motor vehicle, and a laser radar 10 for detecting a front motor vehicle or a front obstacle and also detecting the distance up to such a front motor vehicle or a front obstacle. Data detected by the yaw rate sensor 5, the magnetic sensors 6, the wheel pulse sensor 8, the longitudinal acceleration sensor 9, and the laser radar 10 are supplied to the processors 1, 2 and controllers 3, 4.

As shown in FIG. 2, the magnetic sensors 6 are disposed respectively beneath front and rear bumpers of the motor vehicle. Each of the magnetic sensors 6 detects not only the magnetic information source C positioned therebelow, but also the lateral position of the magnetic sensor 6, i.e., its position in lateral directions of the motor vehicle, with respect to the magnetic information source C within a range of 45 cm on each lateral side of the center of the magnetic information source C, as the lateral position of one of the front and rear ends of the motor vehicle with respect to the magnetic information source C.

When supplied with detected data from the sensors 5, 6, 8, 9 and the laser radar 10, the processors 1, 2 and controllers 3, 4 operate as follows:

The communication signal processor 1 functions as communication means for effecting communication with the LCX cable D and also the other motor vehicle through communication devices 7, 11 on its own motor vehicle which each comprise an antenna and a transmitter/receiver.

Specifically, the communication signal processor 1 receives from the LCX cable D various items of information including information as to a speed command for the motor vehicle in an area in which it is running, information as to the curvature of the road lying ahead of the motor vehicle, information as to traffic jams, and information as to emergency messages. The communication signal processor 1 supplies the received items of information to the control plan processor 2. The communication signal processor 1 transmits the ID number of its own motor vehicle to the LCX cable D. Based on the received ID number, a central control system connected to the LCX cable D can recognize the present position where the motor vehicle is running.

The communication signal processor 1 also transmits to and receives from the other motor vehicle, various items of information including information as to the position where the motor vehicle is running, i.e., the distance which the motor vehicle has traveled, on the running path B from time to time, which position or distance is recognized in a manner described later on, information as to the speed of the motor vehicle, information as to the longitudinal acceleration of the motor vehicle, and information as to a speed plan of the motor vehicle. The communication signal processor 1 supplies the received items of information to the control plan processor 2.

The communication signal processor 1 also serves as running position recognizing means for recognizing the position where the motor vehicle is running on the running path B.

According to this embodiment, the position where the motor vehicle is running is recognized as follows: Since the automatically driven motor vehicle basically runs on the running path B on which the magnetic information sources C are arrayed, the distance that the motor vehicle has traveled on the running path B represents the position where the motor vehicle runs on the running path B. After the motor vehicle has started to run on the running path B, the communication signal processor 1 counts the number of times that the magnetic information sources C are detected by the magnetic sensors 6, multiplies the counted number of times by the constant distance between the magnetic information sources C to determine a distance, and recognizes the determined distance as the distance that the motor vehicle has traveled on the running path B. If the motor vehicle deviates from the running path B, failing to detect the magnetic information sources C, then the communication signal processor 1 recognizes the distance that the motor vehicle has traveled on the running path B, based on an output signal from the wheel pulse sensor 8. Based on the recognized distance, the communication signal processor 1 recognizes the position where the motor vehicle is running on map data, which are carried by the motor vehicle, of the running path B, and gives the recognized position to the control plan processor 2. The map data of the running path B are represented as data of the array of magnetic information sources C, and may be stored in a storage medium that is carried on the motor vehicle or may be received from an external source in every given running zone through communication with the LCX cable D or the like.

In this embodiment, the magnetic information sources C on the running rod B contain bit information whose magnetic polarity is reversed at intervals of 500 m, for example. Each time the bit information is detected by the magnetic sensors 6, the distance which the motor vehicle has traveled is corrected according to the intervals of 500 m, e.g., it is corrected into an integral multiple of 500 m.

An automatic driving start switch 12 is connected to the control plan processor 2. When the automatic driving start switch 12 is turned on, the control plan processor 2 starts generating information for automatically driving the motor vehicle.

The control plan processor 2 has a function as speed plan generating means for generating a speed plan which governs the relationship between the position in which the motor vehicle runs and the speed at which the motor vehicle runs on the running path B. based on speed command information in the area in which the motor vehicle is running, given from the LCX cable D through the communication signal processor 1. The control plan processor 2 produces a speed plan according to the speed command supplied from the LCX cable D. For example, when the control plan processor 2 is supplied with a speed command of 80 km/h in a certain running area, if the present speed of the motor vehicle is 78 km/h, then the control plan processor 2 generates a speed plan for increasing the speed of the motor vehicle up to 80 km/h at an acceleration of 2 km/h/min., for example, and then maintaining the speed of 80 km/h.

The control plan processor 2 also has a function as planned value determining means for determining, based on the speed plan thus generated, a planned position to be reached from the present position of the motor vehicle after a predetermined time T, e.g., 1.5 seconds, and a planned speed of the motor vehicle at the planned position. According to this function, if the speed plan from the present position of the motor vehicle is generated such that the motor vehicle is to maintain the speed of 80 km/h, i.e., 22.2 m/sec., then the planned position to be reached after the predetermined time T, e.g., 1.5 seconds is 33.3 m spaced from the present position down the running path B, and the planned speed at the planned position to be reached is 80 km/h.

The control plan processor 2 further has functions as predicted value calculating means, deviation calculating means, and acceleration/deceleration data calculating means, as described below. The control plan processor 2 on the following motor vehicle which runs behind the front motor vehicle also has functions as front motor vehicle predicted value calculating means, predicted intervehicular distance calculating means, intervehicular speed difference calculating means, and second acceleration/deceleration data calculating means, as described below.

The function as the predicted value calculating means serves to determine a predicted position and a predicted speed to be reached by its own motor vehicle after the predetermined time T. The predicted position is determined according to a calculation, described below, from the present position, i.e., the traveled distance, the present speed, and the present acceleration of the motor vehicle which are given from the communication signal processor 1, and the predicted speed is determined according to a calculation, described below, from the present speed and the present acceleration of the motor vehicle.

The speed of the motor vehicle, based on which the predicted position and the predicted speed will be determined, is basically determined from a latest first-order differential of the position where the motor vehicle runs, which is given, from time to time, from the communication signal processor 1, i.e., from a change in the position where the motor vehicle runs per unit time. Similarly, the acceleration of the motor vehicle is basically determined from a latest second-order differential of the position where the motor vehicle runs, i.e., from a rate of change in the position where the motor vehicle runs per unit time. The predicted position and the predicted speed are determined using the speed and the acceleration of the motor vehicle which are thus determined. However, if the motor vehicle deviates from the running path B and the position where the motor vehicle runs cannot properly be recognized, then the predicted position and the predicted speed are determined using a speed detected from a change per unit time in the traveled distance recognized from an output signal from the wheel pulse sensor 8, and an acceleration detected by the longitudinal acceleration sensor 9. The speed of the motor vehicle may be detected by a speed sensor.

The function as the deviation calculating means serves to determine a distance deviation, i.e., a position error, between a planned position to be reached by the motor vehicle after the predetermined time T based on the speed plan and the predicted position, described above, to be reached by the motor vehicle, and also determines a speed deviation, i.e., a speed error, between a planned speed to be reached by the motor vehicle after the predetermined time T based on the speed plan and the predicted speed, described above, to be reached by the motor vehicle. These deviations are calculated by subtractions.

The function as the acceleration/deceleration data calculating means serves to generate acceleration/deceleration correcting data, i.e., a control quantity for correcting the acceleration or deceleration of the motor vehicle, based on the distance deviation and the speed deviation described above. In this embodiment, the acceleration/deceleration correcting data are generated by multiplying the distance deviation and the speed deviation by respective predetermined gain coefficients, thus producing product values, and then adding the product values to each other.

The function as the front motor vehicle predicted value calculating means on the following motor vehicle serves to determine a predicted position and a predicted speed to be reached by the front motor vehicle after the predetermined time T. The predicted position of the front motor vehicle is determined according to a calculation, described below, from the present position, i.e., the traveled distance, the present speed, and the present acceleration of the front motor vehicle which are recognized by the communication signal processor 1 through communications between the front and following motor vehicles, and the predicted speed of the front motor vehicle is determined according to a calculation, described below, from the present speed and the present acceleration of the front motor vehicle. The present speed and the present acceleration of the front motor vehicle may be determined by first- and second-order differentials of the position where the front motor vehicle runs, from the data of the position where the front motor vehicle runs, which is given through communications between the front and following motor vehicles.

The function as the predicted intervehicular distance calculating means on the following motor vehicle serves to determine an intervehicular distance between its own motor vehicle and the front motor vehicle, which is predicted after the predetermined time T. The intervehicular distance after the predetermined time T is determined by calculating a distance difference between the predicted position, determined as described above, to be reached by the front motor vehicle and the predicted position, determined as described above, to be reached by the its own motor vehicle.

The function as the intervehicular speed difference calculating means on the following motor vehicle serves to determine a speed difference between the following motor vehicle and the front motor vehicle, which is predicted after the predetermined time T. The intervehicular speed difference after the predetermined time T is determined by calculating a difference between the predicted speed of the front motor vehicle and the predicted speed of the motor vehicle of its own.

The function as the second acceleration/deceleration data calculating means on the following motor vehicle serves to generate acceleration/deceleration correcting data, i.e., a control quantity for correcting the acceleration or deceleration of the motor vehicle, based on the predicted intervehicular distance and the intervehicular speed difference described above. In this embodiment, the acceleration/deceleration correcting data are generated by multiplying the predicted intervehicular distance as adjusted by a target intervehicular distance depending on the speed of the motor vehicle of its own, by a predetermined gain coefficient, thus producing a product value, multiplying the intervehicular speed difference by a predetermined gain coefficient, thus producing a product value, and adding the produced product values to each other.

The control plan processor 2 which has the above functions also serves to determine a present lateral positional deviation of the motor vehicle from the running path B, i.e., the array of magnetic information sources C, and a directional deviation, i.e., an angle θ (see FIG. 2) formed between the motor vehicle and the running path B, based on output signals from the two magnetic sensors 6 which represent lateral positional data of the magnetic sensors 6 with respect to the running path B. The control plan processor 2 also predicts a lateral positional deviation and a directional deviation of the motor vehicle from the running path B after the predetermined time T, based on the present speed and steering quantity of the motor vehicle and curvature information of the road which is given from the LCX cable D. These data are used for steering control to run the motor vehicle along the running path B.

Furthermore, the control plan processor 2 on the following motor vehicle outputs, to an image display unit 18 and a sound output unit 17, various data including the speed of its own motor vehicle, the speed of the front motor vehicle, the distance up to the front motor vehicle, the configuration of the road ahead of the motor vehicle, the configuration of the lane ahead of the motor vehicle, etc.

If the motor vehicle is running as a front motor vehicle ahead of another motor vehicle, then its control plan processor 2 outputs, to the image display unit 18 and the sound output unit 17, various data including the speed of its own motor vehicle, the speed of the following motor vehicle, the distance up to the following motor vehicle, the configuration of the road ahead of the motor vehicle, the configuration of the lane ahead of the motor vehicle, etc.

The data of the distance between the front and following motor vehicles are obtained by the intervehicular communications between the motor vehicles or the laser radar 10, and the data of the configuration of the road ahead of the motor vehicle, the configuration of the lane ahead of the motor vehicle, etc. are obtained by the communications with the LCX cable D.

In this embodiment, the predetermined time T is set to 1.5 seconds. The predetermined time T should preferably be set to a value in the range from 1 to 2 seconds.

The lateral vehicle controller 3 generates a steering angle command signal for moving the motor vehicle along the running path B based on output signals indicative of the lateral positional deviation and the directional deviation, from the control plan processor 2, and outputs the steering angle command signal to control an actuator 14 in a steering operation transmitting system of the motor vehicle.

In response to the command signal, the actuator 14 then automatically steers the motor vehicle to run along the running path B, i.e., the array of magnetic information sources C.

The vehicle speed controller 4 generates an acceleration command signal to control the acceleration or deceleration of the motor vehicle based on the acceleration/deceleration correcting data generated by the control plan processor 2, and outputs the acceleration command signal to control an actuator 15 in a throttle system of the motor vehicle and an actuator 16 in a brake system of the motor vehicle.

In response to the acceleration command signal, the actuators 15, 16 automatically control the throttle and brake systems of the motor vehicle to accelerate or decelerate the motor vehicle.

A brake pedal switch 13 for detecting when a brake pedal (not shown) of the motor vehicle is pressed is connected to the vehicle speed controller 4. If the brake pedal switch 13 detects that the brake pedal is pressed, then the control process of the vehicle speed controller 4 is canceled.

The vehicle speed controller 4 controls braking forces applied to the motor vehicle based on an output signal from the laser radar 10 in the event that the laser radar 10 detects an obstacle other than a front motor vehicle, for example.

Figure 3:
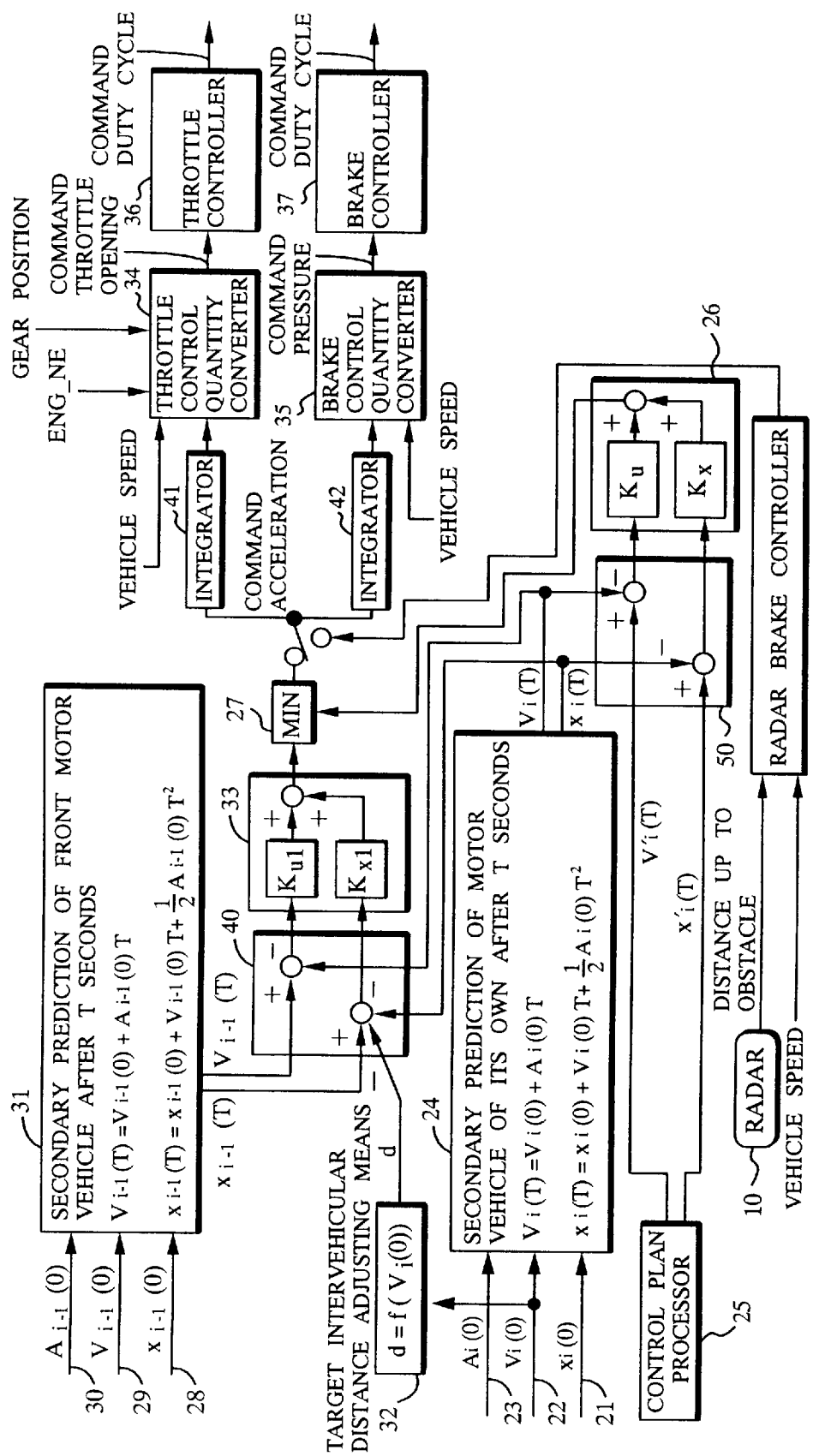
FIG. 3 is a block diagram of an apparatus for controlling the speed of travel of each of the automatically driven motor vehicles shown in FIG. 1.

A vehicle speed control process for controlling the speed of travel of the automatically driven motor vehicle will be described below with reference to FIG. 3.

A position Xi(0) 21 of the motor vehicle of its own, which is determined based on detected signals from the magnetic sensors 6 by the communication signal processor 1, a speed Vi(0) (a first-order differential of the position) 22 of the motor vehicle of its own, which is determined from the position Xi(0) 21 by the control plan processor 2, and an acceleration Ai(0) (a second-order differential of the position) 23 of the motor vehicle of its own are outputted to a processor 24 which predicts a state of the motor vehicle of its own after T seconds in the control plan processor 2.

The processor 24 functions as the predicted value calculating means, and determines a predicted position Xi(T) to be reached after the T seconds and a predicted speed Vi(T) to be reached after the T seconds according to the following respective equations (1), (2):

$$Vi(T)=Vi(0)+Ai(0)\times T \qquad (1)$$

$$Xi(T)=Xi(0)+Vi(0)\times T+\tfrac{1}{2}\times Ai(0)\times T^2 \qquad (2)$$

A control plan processor 25 of the control plan processor 2, which functions as the speed plan generating means and the planned value determining means, generates a speed plan along the running path B and determines a planned position Xi'(T) and a planed speed Vi'(T) which are to be reached by the motor vehicle after the T seconds, based on a speed command from the LCX cable D.

The predicted position Xi(T) and the predicted speed Vi(T) which are determined by the processor 24, and the planned position Xi'(T) and the planed speed Vi'(T) which are determined by the processor 25 are outputted to a deviation calculator 50 which has a function as the deviation calculating means. The deviation calculator 50 subtracts the predicted position Xi(T) and the predicted speed Vi(T) respectively from the planned position Xi'(T) and the planed speed Vi'(T), thereby producing a distance deviation and a speed deviation after the T seconds. The distance deviation and the speed deviation are outputted to a converter 26 which has a function as the acceleration/deceleration data calculating means.

The converter 26 generates acceleration/deceleration correcting data by multiplying the distance deviation and the speed deviation by respective predetermined gains Kx, Ku and adding the product values to each other, and outputs the generated acceleration/deceleration correcting data to a comparator 27 in the vehicle speed controller 4.

The above process is carried out in each of the front and following motor vehicles.

In the following motor vehicle, a present position Xi-1(0) 28 where the front motor vehicle runs, a present speed Vi-1(0) 29 of the front motor vehicle, and a present acceleration Ai-1(0) 30 of the front motor vehicle, which are obtained through intervehicular communications with the front motor vehicle, are outputted to a processor 31 which predicts a state of the front motor vehicle after the T seconds in the control plan processor 2 on the following motor vehicle.

The processor 31, which functions as the front motor vehicle predicted value calculating means, determines a predicted position Xi-1(T) to be reached by the front motor vehicle after the T seconds and a predicted speed Vi-1(T) to be reached by the front motor vehicle after the T seconds according to the same equations as the respective equations (1), (2) (see FIG. 3) described above.

The predicted position Xi-1(T) and the predicted speed Vi-1(T) which are determined by the processor 31, and the predicted position Xi(T) and the predicted speed Vi(T) of the motor vehicle of its own (the following motor vehicle) which are determined by the processor 24 are outputted to an intervehicular calculator 40 which functions as the predicted intervehicular distance calculating means and the intervehicular speed difference calculating means. The intervehicular calculator 40 subtracts the predicted position Xi(T) and the predicted speed Vi(T) respectively from the predicted position Xi-1(T) and the predicted speed Vi-1(T), thereby producing a predicted intervehicular distance and an intervehicular speed difference after the T seconds.

The control plan processor 2 also has target intervehicular distance adjusting means 32 for adjusting an intervehicular distance depending on the speed Vi(0) 22 of the following motor vehicle. The intervehicular calculator 40 subtracts a target intervehicular distance d generated depending on the speed Vi(0) 22 of the following motor vehicle according to a given function by the target intervehicular distance adjusting means 32 from a predicted intervehicular distance after the T seconds, which has been produced by subtracting the predicted position Xi-1(T) to be reached by the front motor vehicle from the predicted position Xi(T) to be reached by the motor vehicle of its own (the following motor vehicle), thereby producing a deviation of the predicted intervehicular distance from the target intervehicular distance d.

The intervehicular calculator 40 operates in the manner described above in order to prevent the following motor vehicle from getting too close to the front motor vehicle at a time near the end of the running cycle. The target intervehicular distance adjusting means 32 may be dispensed with depending on how the intervehicular distance is established.

The intervehicular distance data, i.e., the deviation of the target intervehicular distance from the predicted intervehicular distance, thus calculated by the intervehicular calculator 40, and the intervehicular speed difference data are supplied to a converter 33 which functions as the second acceleration/deceleration data calculating means. The converter 33 generates acceleration/deceleration correcting data by multiplying the intervehicular distance data and the intervehicular speed difference data respectively by predetermined gains Kx1, Ku1 and adding the product values to each other, and outputs the generated acceleration/deceleration correcting data to the comparator 27 in the vehicle speed controller 4.

The comparator 27 compares the acceleration/deceleration correcting data (outputted from the converter 26) based on a predicted deviation after the T seconds with respect to the speed plan with the acceleration/deceleration correcting data (outputted from the converter 33) based on the predicted intervehicular distance up to, and the intervehicular speed difference with, the front motor vehicle after the T seconds, alternatively selects one of the acceleration/deceleration correcting data to reduce the forward acceleration of the motor vehicle so that the following motor vehicle will not get too close to the front motor vehicle, and outputs the selected acceleration/deceleration correcting data to a throttle-side integrator 41 and a brake-side integrator 42.

If there is no other motor vehicle in front of the front motor vehicle or any other motor vehicle in front of the front motor vehicle is sufficiently spaced from the front motor vehicle, then the comparator 27 on the front motor vehicle outputs the acceleration/deceleration correcting data (outputted from the converter 26) based on a predicted deviation after the T seconds with respect to the speed plan.

The comparator 27 on the front motor vehicle may output the acceleration/deceleration correcting data outputted from the converter 26. The comparator 27 on the following motor vehicle may output the acceleration/deceleration correcting data outputted from the converter 33.

When supplied with the acceleration/deceleration correcting data, the integrators 41, 42 integrate the acceleration/deceleration correcting data and output respective integrated values (corresponding to a target vehicle speed) to a throttle control quantity converter 34 and a brake control quantity converter 35, respectively.

The throttle control quantity converter 34 is supplied with data of the present speed of the motor vehicle, the rotational speed of an engine (not shown), and the gear position of a transmission (not shown) in addition to the output data from the integrator 41. The throttle control quantity converter 34 determines an indicated throttle opening using a predetermined map or the like from the supplied data. The indicated throttle opening is given to a throttle controller 36, which supplies an indicated duty cycle that determines the control quantity for the actuator 15 thereby to control the actuator 15.

The brake control quantity converter 35 is supplied with data of the present speed of the motor vehicle in addition to the output data from the integrator 42. The brake control quantity converter 35 determines an indicated brake pressure using a predetermined map or the like from the supplied data. The indicated brake pressure is given to a brake controller 37, which supplies an indicated duty cycle that determines the control quantity for the actuator 16 thereby to control the actuator 16.

According to the above control process, the speed of the front motor vehicle is controlled according to the speed plan by the acceleration/deceleration correcting data for the speed plan based on the predicted deviation after the T seconds of the motor vehicle with respect to the speed plan. If an appropriate intervehicular distance up to the front motor vehicle can be maintained, the speed of the following motor vehicle is controlled according to the acceleration/deceleration correcting data based on the predicted deviation after the T seconds of the following motor vehicle with respect to the speed plan. If an appropriate intervehicular distance up to the front motor vehicle cannot be maintained, the speed of the following motor vehicle is controlled according to the acceleration/deceleration correcting data based on the predicted intervehicular distance up to, and intervehicular speed difference with, the motor vehicle after the T seconds.

If the magnetic information sources C cannot be detected and hence the position where the front motor vehicle runs cannot correctly be detected, then the intervehicular distance is controlled using an output signal from the laser radar 10 as follows:

If it is assumed that the length of each of the following and front motor vehicles is represented by dc (e.g., 5 m), the position where the front motor vehicle runs by Xi-1, the position where the motor vehicle of its own (the following motor vehicle) runs by Xi, and the intervehicular distance detected based on the output signal from the laser radar 10 by dr, then the position Xi-1 where the front motor vehicle runs is calculated, from time to time, as follows:

$$Xi\text{-}1 = Xi + dr + dc \qquad (3)$$

The calculated position Xi-1 where the front motor vehicle runs is supplied, instead of the above predicted position Xi-1(T) to be reached by the front motor vehicle, to the intervehicular calculator 40.

If the intervehicular communications between the motor vehicles cannot properly be carried out due to a failure, then since the following motor vehicle cannot obtain data about the position where the front motor vehicle runs and the speed of the motor vehicle through the intervehicular communications, the output signal from the laser radar 10 is used to produce such data. Specifically, the position Xi-1 where the front motor vehicle runs is determined according to the above equation (3), and the speed $V_{i-1}$ of the front motor vehicle is determined by differentiating a distance difference $(d_r+d_c)$ between the position $X_i$ of the motor vehicle of its own and the position $X_{i-1}$ of the front motor vehicle to produce a relative speed of the front motor vehicle with respect to the motor vehicle of its own, and adding the relative speed to the speed $V_i$ of the motor vehicle of its own. The position $X_{i-1}$ where the front motor vehicle runs and the speed $V_{i-1}$ of the motor vehicle thus produced are supplied, instead of the above predicted position $X_{i-1}(T)$ to be reached by the front motor vehicle and the above predicted speed $V_{i-1}(T)$ of the front motor vehicle, to the intervehicular calculator 40.

In the lateral (steering) positional control according to the present embodiment, a predicted position to be reached by the motor vehicle after a predetermined time and a positional deviation and a directional deviation from a target position to be reached on the running path B are determined based on the lateral positional deviation and directional deviation (angular deviation) from the running path B at the present position of the motor vehicle, which are obtained based on output signals from the front and rear magnetic sensors 6, and also based on the curvature information of the road ahead of the motor vehicle, which is obtained from the LCX cable D, and a steering quantity of the motor vehicle is determined to steer the motor vehicle along the running path B.

The automatically driven motor vehicle according to the above embodiment controls its speed by determining acceleration/deceleration correcting data of the motor vehicle based on predicted deviations from the speed plan of future position and speed of the motor vehicle that are predicted after the T seconds. Therefore, the automatically driven motor vehicle can be controlled to automatically run smoothly along the running path B. The following motor vehicle controls its speed by determining acceleration/deceleration correcting data of its own based on future predicted intervehicular distance and speed difference that are predicted after the T seconds between its own motor vehicle and the front motor vehicle. Consequently, the following motor vehicle can be controlled to automatically run smoothly along the running path B while reliably maintaining an appropriate distance between itself and the front motor vehicle.

Because the front motor vehicle and the following motor vehicle have the same system arrangement, the front motor vehicle and the following motor vehicle can be controlled to be automatically driven in appropriate modes thereof according to respective software details or programs which differ from each other only slightly.

The communication signal processor 1, the control plan processor 2, the lateral (steering) vehicle controller 3, and the vehicle speed controller 4 are constructed as respective modules each comprising a central processing unit (CPU). Therefore, they can process signals highly accurately at high speeds.

In the illustrated embodiment, the wheel pulse sensor 8, the longitudinal acceleration sensor 9, and the laser radar 10 are provided in the event of a failure to detect the magnetic information sources C. However, the wheel pulse sensor 8, the longitudinal acceleration sensor 9, and the laser radar 10 may be dispensed with, and the position where the motor vehicle runs, i.e., the distance which the motor vehicle has traveled, may be recognized by the number of times that the magnetic information sources C are detected, and the recognized position may be subjected to first- and second-order differentiation to recognize the speed and acceleration respectively of the motor vehicle.

The information sources on the running path B are not limited to magnetic information sources C, but may comprise colored or graphic marks on the running path B which may be optically detected. The interval between those marks is not limited to 1 m.

While the LCX cable D is used as a travel information providing facility in the illustrated embodiment, a cellular radio communication apparatus or beacon may be used as such a travel information providing facility.

Although a certain preferred embodiment of the present invention has been shown and described in detail, it should be understood that various changes and modifications may be made therein without departing from the scope of the appended claims.

What is claimed is:

1. An automatically driven motor vehicle for automatically running on a running path having markers while detecting the path markers with a marker sensor, comprising:

position recognizing means for recognizing a present position of the motor vehicle on the running path, said position recognizing means comprising means for detecting a distance traversed be the motor vehicle along the running path, and means for recognizing the present position of the motor vehicle based on the detected distance;

speed plan generating means for generating a speed plan which governs a position and a speed of the motor vehicle on the running path;

planned value determing means for determining a planned position to be reached by the motor vehicle after a predetermined time and a planned speed of the motor vehicle at said planned position, from the present position of the motor vehicle based on said speed plan;

predicted value calculating means for determining a predicted position to be reached by the motor vehicle after said predetermined time and a predicted speed of the motor vehicle at said predicted position, from the present positions, speed and acceleration of the motor vehicle:

deviation calculating means for determining a distance deviation between said planned position and said predicted position and a speed deviation between said planned speed and said predicted speed;

acceleration/deceleration data calculating means for generating acceleration/deceleration correcting data for the motor vehicle based on said distance deviation and said speed deviation; and acceleration/deceleration control means for controlling acceleration/deceleration of the motor vehicle based on said acceleration/deceleration correcting data;

wherein said path markers comprise an array of magnetic information sources arranged at a predetermined interval, and said position recognizing means comprises means for detecting said distance based on the number of times that the magnetic information sources are detected by said marker sensor.

2. An automatically driven motor vehicle for automatically running on a running path having path markers while detecting the path markers with a marker sensor, comprising;

position recognizing means for recognizing a present position of the motor vehicle on the running path, said position recognizing means comprising means for detecting a distance traversed by the motor vehicle along the running path, and means for recognizing the present position of the motor vehicle based on the detected distance;

speed plan generating means for generating a speed plan which governs a position and a speed of the motor vehicle on the running path;

planned value determining means for determining a planned position to be reached by the motor vehicle after a predetermined time and a planned speed of the motor vehicle at said planned position, from the present position of the motor vehicle based on said speed plan;

predicted value calculating means for determining a predicted position to be reached by the motor vehicle after said predetermined time and a predicted speed of the motor vehicle at said predicted position, from the present position, speed, and acceleration of the motor vehicle;

deviation calculating means for determining a distance deviation between said planned position and said predicted position and a speed deviation between said planned speed and said predicted speed;

acceleration/deceleration data calculating means for generating acceleration/deceleration correcting data for the motor vehicle based on said distance deviation and said speed deviation; acceleration/deceleration control means for controlling acceleration/deceleration of the motor vehicle based on said acceleration/deceleration correcting data; and communication means for transmitting travel information to and receiving travel information from a travel information providing facility installed outside of the motor vehicle;

said speed plan generating means comprising means for generating said speed plan based on speed command information supplied from said travel information providing facility through said communication means to the speed plan generating means.

3. An automatically driven motor vehicle according to claim 2, wherein said travel information providing facility comprises a leakage coaxial cable installed along said running path.

4. An automatically driven motor vehicle for automatically running on a running path having path markers while detecting the path markers with a marker sensor, comprising:

position recognizing means for recognizing a present position of the motor vehicle on the running path, said position recognizing means comprising means for detecting a distance traversed by the motor vehicle along the running path, and means for recognizing the present position of the motor vehicle based on the detected distance;

speed plan generating means for generating a speed plan which governs a position and a speed of the motor vehicle on the running path;

planned value determining means for determining a planned position to be reached by the motor vehicle after a predetermined time and a planned speed of the motor vehicle at said planned position, from the present position of the motor vehicle based on said speed plan;

predicted value calculating means for determining a predicted position to reached by the motor vehicle after said predetermined time and a predicted speed of the motor vehicle at said predicted position, from the present position, speed, and acceleration of the motor vehicle;

deviation calculating means for determining a distance deviation between said planned position and said predicted position and a speed deviation between said planned speed and said predicted speed;

acceleration/deceleration data calculating means for generating acceleration/deceleration correcting data for the motor vehicle based on said distance deviation and said speed deviation; and acceleration/deceleration control means for controlling acceleration/deceleration of the motor vehicle based on said acceleration/deceleration correcting data;

said predicted value calculating means comprising means for calculating said predicted position from the present position, a speed of the motor vehicle expressed by a first-order differential of the present position, and an acceleration of the motor vehicle expressed by a second-order differential of the present position, and for calculating said predicted speed from the speed of the motor vehicle expressed by the first-order differential of the present position, and the acceleration of the motor vehicle expressed by the second-order differential of the present position.

5. An automatically driven following motor vehicle for automatically running on a running path having path markers while detecting the path markers with a marker sensor, comprising:

position recognizing means for recognizing a present position of the following motor vehicle on the running path, said position recognizing means comprising means for detecting a distance traversed by the following motor vehicle along the running path, and means for recognizing the present position of the following motor vehicle based on the detected distance;

speed plan generating means for generating a speed plan which governs a position and a speed of the following motor vehicle on the running path;

planned value determining means for determining a planned position to be reached by the following motor vehicle after a predetermined time and a planned speed of the following motor vehicle at said planned position, from the present position of the following motor vehicle based on said speed plan;

predicted value calculating means for determining a predicted position to be reached by the following motor vehicle after said predetermined time and a predicted speed of the following motor vehicle at said predicted position, from the present position, speed, and acceleration of the following motor vehicle;

deviation calculating means for determining a distance deviation between said planned position and said predicted position and a speed deviation between said planned speed and said predicted speed;

acceleration/deceleration data calculating means for generating acceleration/deceleration correcting data for the following motor vehicle based on said distance deviation and said speed deviation;

acceleration/deceleration control means for controlling acceleration/deceleration of the following motor vehicle based on said acceleration/deceleration correcting data;

intervehicular communication means for transmitting and receiving information indicative of positions of a front and the following motor vehicles at least between the front and following motor vehicles;

front motor vehicle predicted value calculating means for determining a predicted position to be reached by the front motor vehicle after said predetermined time and a predicted speed of the front motor vehicle at said predicted position, from the information received through said intervehicular communication means;

predicted intervehicular distance calculating means for determining an intervehicular distance between the front and following motor vehicles after said predetermined time, from the predicted position to be reached by the front motor vehicle and the predicted position determined by said predicted value calculating means; and intervehicular speed difference calculating means for determining an intervehicular speed difference between the front and following motor vehicles after said predetermined time, from the predicted speed to be reached by the front motor vehicle and the predicted speed determined by said predicted value calculating means.

6. An automatically driven motor vehicle according to claim 5, further comprising:

second acceleration/deceleration data calculating means for generating acceleration/deceleration correcting data for the following motor vehicle based on said intervehicular distance and said intervehicular speed difference, said acceleration/deceleration control means comprising means for alternatively selecting the acceleration/deceleration correcting data generated by said acceleration/deceleration data calculating means and the acceleration/deceleration correcting data generated by said second acceleration/deceleration data calculating means to control the acceleration/deceleration of the following motor vehicle.

7. An automatically driven motor vehicle according to claim 6, wherein said acceleration/deceleration control means comprises means for selecting on e of the acceleration/deceleration correcting data generated by said acceleration/deceleration data calculating means and the acceleration/deceleration correcting data generated by said second acceleration/deceleration data calculating means, one of which reduces the forward acceleration of the following motor vehicle.

8. An automatically driven motor vehicle according to claim 5, wherein said predicted value calculating means comprises means for calculating said predicted position from a position of the front motor vehicle obtained through said intervehicular communication means, a speed of the front motor vehicle expressed by a first-order differential of the position, and an acceleration of the front motor vehicle expressed by a second-order differential of the position, and calculating the predicted speed of the front motor vehicle from the speed of the front motor vehicle expressed by the first-order differential of the position and the acceleration of the front motor vehicle expressed by the second-order differential of the position.

9. An automatically driven motor vehicle according to claim 5, wherein the information transmitted and received through said intervehicular communication means includes a speed and an acceleration of the motor vehicle, said front motor vehicle predicted value calculating means comprising means for calculating the predicted position of the front motor vehicle from the position, speed, and acceleration of the front motor vehicle which are obtained through said intervehicular communication means, and calculating the predicted speed of the front motor vehicle from the speed and acceleration of the front motor vehicle which are obtained through said intervehicular communication means.

10. An automatically driven motor vehicle for automatically running on a running path having path markers while detecting the path markers with a marker sensor, comprising:

position recognizing means for recognizing a present position of the motor vehicle on the running path;

intervehicular communication means for transmitting and receiving information relative to positions of front and following motor vehicles at least between the front and following motor vehicles;

own motor vehicle predicted value calculating means for determining a predicted position to be reached by its own motor vehicle after a predetermined time and a predicted speed to be reached by its own motor vehicle at said predicted position, based on the present position, speed, and acceleration of its own motor vehicle;

front motor vehicle predicted value calculating means for determining a predicted position to be reached by the front motor vehicle after said predetermined time and a predicted speed to be reached by the front motor vehicle at said predicted position, from the information received from the front motor vehicle through said intervehicular communication means;

predicted intervehicular distance calculating means for determining an intervehicular distance between the front and its own motor vehicles after said predetermined time, from the predicted position to be reached by the front motor vehicle and the predicted position to be reached by its own motor vehicle;

intervehicular speed difference calculating means for determining an intervehicular speed difference between the front and its own motor vehicles after said predetermined time, from the predicted speed to be reached by the front motor vehicle and the predicted speed to be reached by its own motor vehicle;

acceleration/deceleration data calculating means for generating acceleration/deceleration correcting data for the motor vehicle based on said intervehicular distance and said intervehicular speed difference; and acceleration/deceleration control means for controlling acceleration/deceleration of its own motor vehicle based on said acceleration/deceleration correcting data.

* * * * *

UNITED STATES PATENT AND TRADEMARK OFFICE
CERTIFICATE OF CORRECTION

PATENT NO. : 5,887,268
DATED : March 23, 1999
INVENTOR(S) : Yoshimi Furukawa

It is certified that error appears in the above-indentified patent and that said Letters Patent is hereby corrected as shown below:

On the title page, item [57]
In the Abstract, line 13, change "planned" to -- predicted --.

Column 2, line 20, change "be-reached" to -- be reached --.

Column 16, line 17, after the word "having", insert -- path --.

Column 16, line 23, change " be " to -- by --.

Column 16, line 39, change " positions " to -- position --.

Column 17, line 25, after "deviation;" start a new paragraph.

Column 19, line 35, change " on e" to -- one --.

Signed and Sealed this

Twenty-third Day of November, 1999

*Attest:*

Q. TODD DICKINSON

*Attesting Officer*   *Acting Commissioner of Patents and Trademarks*